March 1, 1927.
E. P. GRAY
1,619,117
VALVE CONTROL
Filed Sept. 25, 1925
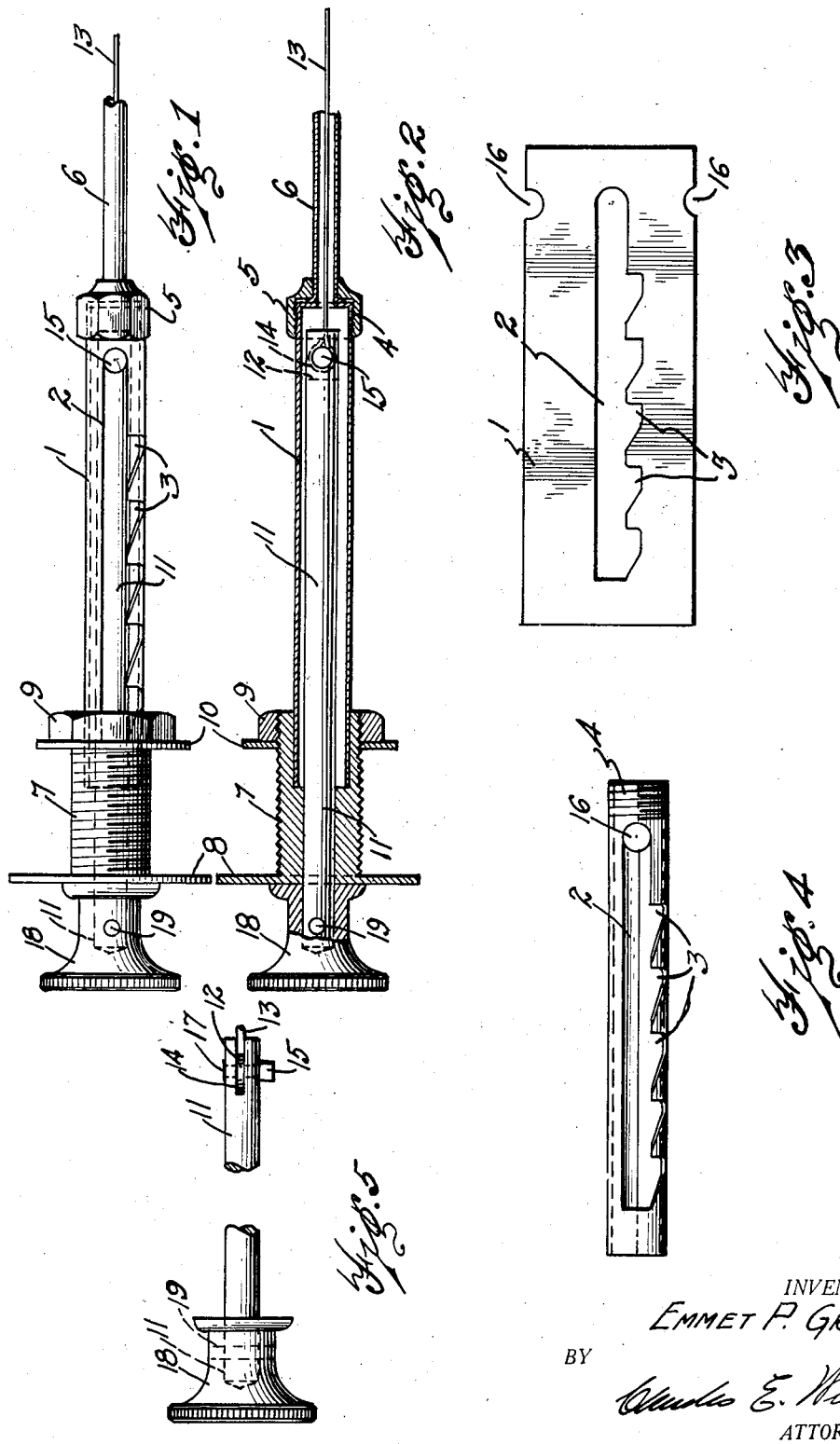
INVENTOR.
EMMET P. GRAY
BY
ATTORNEY.

Patented Mar. 1, 1927.

1,619,117

UNITED STATES PATENT OFFICE.

EMMET P. GRAY, OF DETROIT, MICHIGAN.

VALVE CONTROL.

Application filed September 25, 1925. Serial No. 58,480.

This invention relates to valve controls and the object of the invention is to provide a control particularly adapted for use with an automobile to control a choke valve, a cutout valve, a heater valve or the like.

Another object of the invention is to provide a valve control comprising a tubular member having a movable rod extending thereinto, the tubular member being provided with a longitudinal slot and the rod being provided with a pin riding therein, the said slot being provided with a series of notches opening therefrom in which the pin is adapted to engage to provide various adjustments for the control rod.

A further object of the invention is to provide a valve control in which the control rod is connected to the valve being controlled by a spring wire, the spring wire being placed under a twisting tension tending to turn the control rod to hold the pin thereon in engagement with one of the said notches.

These objects and the several novel features of the invention are hereinafter more fully described and claimed and the preferred form of construction by which these objects are attained is shown in the accompanying drawings in which—

Fig. 1 is an elevation of a valve control embodying my invention.

Fig. 2 is a longitudinal section through the control.

Fig. 3 is a view of the blank for forming the control tube.

Fig. 4 is a view of the blank rolled to form.

Fig. 5 is an elevation of the control rod and knob.

As shown in Fig. 3 a sheet metal blank 1 is formed having a longitudinal slot 2 therein and having a series of notches 3 opening from the slot 2. This sheet metal blank is rolled to cylindrical form as shown in Fig. 4 and the end 4 thereof is threaded to receive the nut 5.

This nut 5 also secures the tube 6, which is provided with a flared end, to the member 1. As shown in Fig. 2 the member 1 at the opposite end is welded or sweated into a member 7 which is provided with a flange 8 and this member 7 is threaded so that it may be inserted in an instrument board at which time the nut 9 may be turned up to bindingly engage the instrument board between the flange 8 and the washer 10. A rod 11 extends through the member 7 and into the tubular member 1 and is provided with a slot 12 in the end thereof as shown in Fig. 5. A spring wire 13, as shown in Fig. 2, is bent to form an eye 14 in the end thereof and this eye is positioned in the slot 12 and a pin 15 is inserted through the end of the rod 11 and through the eye 14 in the slot 12. The blank 1 shown in Fig. 2 is provided with two semi-circular notches 16 and when the blank is rolled to form these semi-circular notches are brought together and form a circular aperture 16 through which a tool may be inserted to upset the end 17 of the pin 15. The opposite end of the rod 11 extends through the knob 18 and end of the rod 11 thus securing the rod 11 in the knob. The spring wire 13 extends to the carburetor, choke valve, cutout valve, heater valve or the like and when secured to the respective valve is put under a twisting tension which tends to throw the pin 15 into one of the notches 3 of the member 1.

To open the valve to which the spring wire 13 is connected the operator pulls on the knob 19 and the twisting tension on the spring wire 13 throws the pin 15 into the respective notch 3, depending upon the extent to which the knob 18 is pulled out. When the pin is in position in one of the notches 3 the valve is held in the position set and due to the twisting tension on the spring wire 13 the pin 15 cannot very readily shake or jar out of the notch in which it is engaged. To release the pin the operator turns the knob 18 to move the pin 15 out of the respective notch 3 at which time the knob and rod may be moved inwardly until the pin is in the position shown in Fig. 1. By providing a series of notches 3 the valve to which the wire 13 is connected may be adjusted to several different positions and this device provides a control which is readily accessible to the driver of an automobile when positioned on the instrument board and the control may be utilized for controlling various parts of the automobile.

From the foregoing description it becomes evident that the device is very simple and efficient in operation, will not easily get out of order, provides a positive adjustable control for a valve and further provides a device which accomplishes the objects described.

Having thus fully described my invention, what I claim is—

1. A valve control comprising a member adapted to be secured in stationary position, a rod extending through the said member, a knob on the end of the said rod, a tubular member secured to the first named member, the said tubular member being provided with a longitudinal slot having notches opening therefrom, a control wire secured to the end of the rod opposite the knob and adapted to be attached to a valve, the said control wire being placed under a twisting strain when attached to the valve, and a pin on the end of the said rod adapted to engage in the notches of the tubular member due to the twisting strain on the control wire.

2. A valve control comprising a tubular member adapted to be secured in a stationary position, a knob, a rod secured to the knob and extending into the tubular member, the tubular member being provided with a longitudinal slot in the side thereof and a series of notches opening therefrom, a pin in the end of the rod adapted to engage in the slot or notches and a control wire attached to the rod and being normally under torsional strain tending to turn the rod and move the pin to engage a notch.

3. A valve control comprising a tubular member adapted to be secured in a stationary position, a knob, a rod secured to the knob and extending longitudinally into the tubular member, the tubular member being provided with a longitudinal slot in the side thereof and a series of notches opening therefrom, a pin in the end of the rod adapted to engage in the slot or notches, and a control wire secured in the end of the rod about the pin, said control wire being attached to the valve and under torsional strain tending normally to turn thereon.

4. A valve control comprising a stationary notched member, an operating knob, a rod secured thereto and movable longitudinally of the notched member, a pin on the rod and a wire connecting the rod with the part to be operated, said wire being attached to the rod and control part respectively and normally under torsional strain tending to turn the rod to move the pin into a notch.

In testimony whereof I sign this specification.

EMMET P. GRAY.